United States Patent [19]
Bucourt et al.

[11] 3,906,096
[45] Sept. 16, 1975

[54] NOVEL 11β-ALKOXY STEROIDS

[75] Inventors: Robert Bucourt, Paris; André Pierdet, Noisy Le Sec; Jean Salmon, Paris, all of France

[73] Assignee: Roussel-UCLAF, Paris, France

[22] Filed: Mar. 4, 1974

[21] Appl. No.: 447,561

Related U.S. Application Data

[62] Division of Ser. No. 201,564, Nov. 23, 1971, Pat. No. 3,810,887.

[52] U.S. Cl.... 424/243; 260/397.45; 260/239.55 C; 260/397.5
[51] Int. Cl.² ......................................... A61K 31/56
[58] Field of Search................ 424/243; 260/397.45

[56] References Cited
UNITED STATES PATENTS
3,526,648  9/1970  Bertin et al. .................... 260/397.45
3,579,545  5/1971  Bertin et al. .................... 260/397.45

*Primary Examiner*—Elbert L. Roberts
*Attorney, Agent, or Firm*—Hammond & Littell

[57] ABSTRACT

11β-alkoxy-Δ⁴-gonenes of the formula

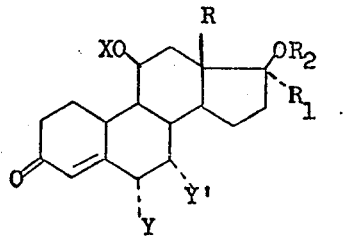

wherein R and X are alkyl of 1 to 4 carbon atoms, $R_1$ is a saturated or unsaturated hydrocarbon of 1 to 6 carbon atoms, $R_2$ is selected from the group consisting of hydrogen and acyl of an organic carboxylic acid of 1 to 18 carbon atoms and Y and Y' are selected from the group consisting of hydrogen and methyl and the enolic esters thereof with an organic carboxylic acid of 1 to 18 carbon atoms which possess anti-androgenic and anti-estrogenic activity, their preparation and novel intermediates.

8 Claims, No Drawings

NOVEL 11β-ALKOXY STEROIDS

PRIOR APPLICATION

This application is a division of our copending, commonly assigned application Ser. No. 201,564, filed Nov. 23, 1971, now U.S. Pat. No. 3,810,887.

STATE OF THE ART

11β-alkoxy-gonanes having 2 or 3 double bonds in the nucleus are known. For example French Pat. No. 1,519,520 discloses 11-alkoxy-$\Delta^{4,9}$-gonadiene-3-ones having a hypophysial inhibiting activity and a hypocholesterolemia activity superior to that of the corresponding 11-hydroxy-derivatives because of their important estrogenic activity.

French BSM Pat. No. 5,519M discloses that 11-methoxy-$\Delta^{1,3,5}$(10)-estratrienes oxygenated in the 3- and 17-positions have a considerable estrogenic activity while the corresponding 11-hydroxy compounds have a very weak estrogenic activity. The teaching of the prior art would therefore lead to the conclusion that introduction of an alkoxy group in the 11-position leads to increased estrogenic activity. Also, 11-hydroxy derivatives of 17α-methyl and 17α-ethyl-19-nortestosterone are known to have anabolic and androgenic activity [Magerlein et al., J.A.C.S., Vol. 80 (1958) p. 2222].

OBJECTS OF THE INVENTION

It is an object of the invention to provide the novel compounds of formula I and their enolic esters.

It is another object of the invention to provide a novel process for the preparation of the compounds of formula I.

It is a further object of the invention to provide novel intermediates for the preparation of the compounds of formula I.

It is a further object of the invention to provide novel anti-hormonal compositions.

It is an additional object of the invention to provide a novel method of blocking hormonal activites in warm-blooded animals.

These and other objects and advantages of the invention will become obvious from the following detailed description.

THE INVENTION

The novel 11β-alkoxy-$\Delta^4$-gonenes of the invention have the formula

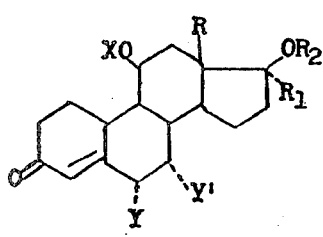

wherein R and X are alkyl of 1 to 4 carbon atoms, $R_1$ is a saturated or unsaturated hydrocarbon of 1 to 6 carbon atoms, $R_2$ is selected from the group consisting of hydrogen and acyl of an organic carboxylic acid of 1 to 18 carbon atoms and Y and Y' are selected from the group consisting of hydrogen and methyl and the enolic esters thereof with an organic carboxylic acid of 1 to 18 carbon atoms.

Preferably, the substituent R is an alkyl such as methyl, ethyl, n-propyl, isopropyl or n-butyl. X is preferably an alkyl such as methyl, ethyl, n-propyl, isopropyl or n-butyl. $R_1$ is preferably alkyl of 1 to 4 carbon atoms such as methyl, ethyl, or propyl; cycloalkyl of 3 to 6 carbon atoms such as cyclopropyl, cyclopentyl or cyclohexyl; alkenyl of 2 to 4 carbon atoms such as vinyl, allyl, 2'-methylally or 2-butenyl; alkynyl or haloalkynyl of 2 to 4 carbon atoms such as ethynyl, 1-propynyl, 2-propynyl, 2-butynyl, butadiynyl, chloroethynyl or trifluoropropynyl; and phenyl.

When $R_2$ represents the acyl residue of an organic carboxylic acid it is preferably the residue of a saturated or unsaturated aliphatic or cycloaliphatic acid and more particularly the residue of an alkanoic acid such as acetic, propionic, butyric, isobutyric or undecylic acid; the residue of a cycloalkylcarboxylic or (cycloalkyl) alkanoic acid such as cyclopropyl, cyclopentyl or cyclohexylcarboxylic acid, cyclopentyl or cyclohexyl, acetic or propionic acid; the residue of benzoic acid or a phenyl-alkanoic acid such as phenylacetic or phenyl-propionic acid; the residue of an aminoacid such as diethylaminoacetic or aspartic acid; or the residue of formic acid.

Examples of specific preferred compounds are 11β-methoxy-17α-ethynyl-$\Delta^4$-estrene-17β-ol-3-one, 11β-ethoxy-17α -ethynyl-$\Delta^4$-estrene-17β-ol-3-one, 11β-methoxy-13β-ethyl-17α-ethynyl-$\Delta^4$-gonene-17β-ol-3-one, 11β-methoxy-17α-ethynyl-17β-butyryloxy-$\Delta^4$-estrene-3-one, 11β-methoxy-13β-ethyl-17α-vinyl-$\Delta^4$-gonene-17β-ol-3-one and 3,17β-dibutyryloxy-11β-methoxy-17α-ethynyl-$\Delta^{3,5}$-estradiene.

The novel process of the invention for the preparation of the 11β-alkoxy-steroids comprises reducing by the Birch reaction a 11β-alkoxy-$\Delta^{1,3,5(10)}$-gonatriene of the formula

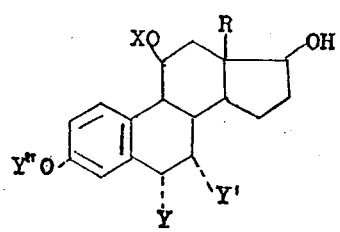

wherein X, R, Y and Y' have the above definitions and Y'' is alkyl of 1 to 4 carbon atoms to form a $\Delta^{2,5(10)}$-gonadiene of the formula

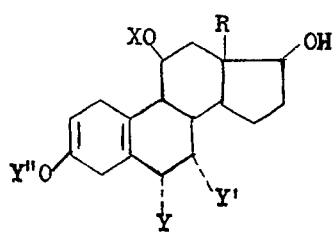

reacting the latter with a ketalization agent to form a $\Delta^{5(10)}$-gonene of the formula

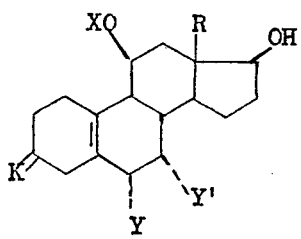

IV wherein K is a ketal group, reacting the latter with an oxidization agent to form a $\Delta^{5(10)}$-gonene-17-one of the formula

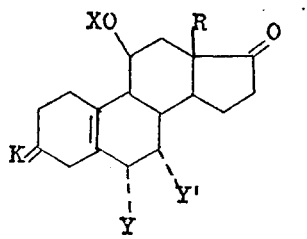

V reacting the latter with an organometallic reactant wherein the organo is $R_1$ as defined above to form a $17\alpha$-$R_1$-$\Delta^{5(10)}$-gonene-$17\beta$-ol of the formula

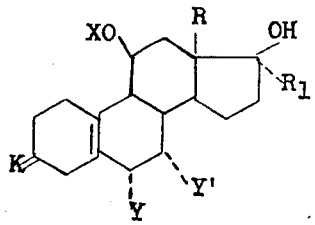

VI and subjecting the latter to acid hydrolysis to obtain the corresponding compound of formula I wherein $R_2$ is hydrogen. The latter compound may be acylated with an organic carboxylic acid of 1 to 18 carbon atoms or a functional derivative thereof.

In a modification of the process, the ketalization of the $\Delta^{2,5(10)}$-gonadiene of formula III may be effected in two steps by acid hydrolysis of the compound of formula III to form a $\Delta^4$-gonene of the formula

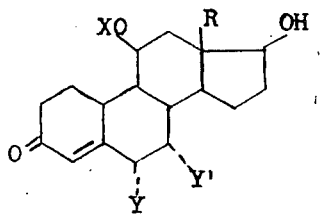

III$^1$ which is then reacted with a ketalization agent. This method results in a mixture of 3-ketal-$\Delta^{5(10)}$ and 3-ketal-$\Delta^{5(6)}$ derivatives which may be used for the next step or from which the predominant 3-ketal-$\Delta^{5(10)}$-isomer can be isolated.

The compounds of formula I can also be prepared by subjecting a $\Delta^{1,3,5(10)}$-gonatriene of formula II to the Birch reduction to obtain the corresponding $\Delta^{2,5(10)}$-gonadiene of formula III, reacting the latter with an oxidizing agent to obtain a $\Delta^{2,5(10)}$-gonadiene-17-one of the formula

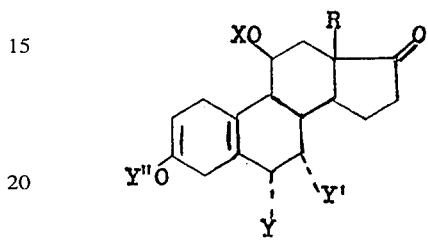

VII reacting the latter with an organometallic reagent wherein the organo is $R_1$ as defined above to form the corresponding $\Delta^{2,5(10)}$-gonadiene-$17\beta$-ol of the formula

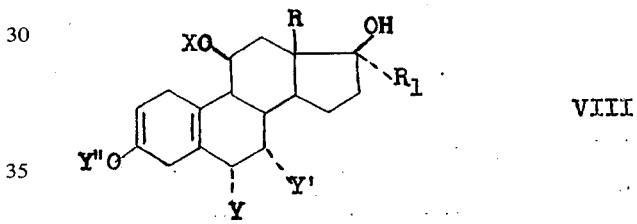

VIII and subjecting the latter to acid hydrolysis to form the corresponding compound of formula I wherein $R_2$ is hydrogen. The latter may be esterified as before.

To prepare compounds of formula I wherein $R_1$ is a saturated hydrocarbon of 1 to 6 carbon atoms, the starting $11\beta$-alkoxy-$\Delta^{1,3,5(10)}$-gonatriene may be substituted in the $17\alpha$-position with $R_1$ before the Birch reduction as it is not concerned by this step and the resulting $\Delta^{2,5(10)}$-gonadiene of the formula

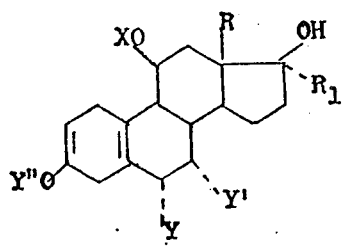

IX wherein $R_1$ is a saturated hydrocarbon is subjected to acid hydrolysis to form the corresponding $11\beta$-alkoxy-$13\beta$-R-$\Delta^4$-gonene-$17\beta$-ol-3-one which may be esterified if desired.

The Birch reduction may also be used by the method of Ruggieri [Anali di Chimica, Vol 48 (1958), p. 1042] with an $11\beta$-alkoxy-$17\alpha$-ethynyl-$\Delta^{1,3,5(10)}$-gonatriene by subjecting the latter to the action of an alkali metal amide (sodium, potassium or lithium in liquid ammonia) to form the

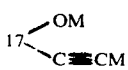

derivative where M is the alkali metal which avoids hydrogenolysis of the 17-hydroxyl. This permits the preparation of a 11β-alkoxy-13β-alkyl-17α-vinyl-Δ⁴-gonene of the formula

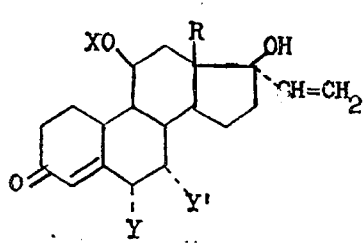

by reacting a compound of the formula

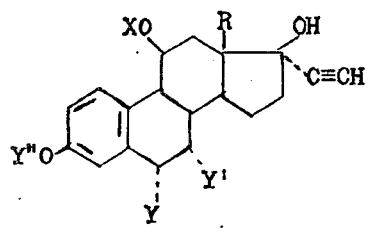

with an alkali metal amide to form a compound of the formula

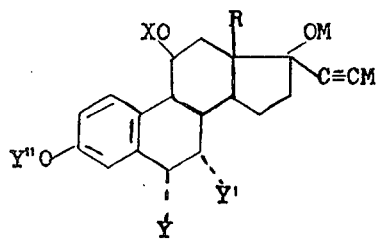

where M is an alkali metal and subjecting the latter to the Birch reduction followed by acid hydrolysis.

The Birch reduction is preferably effected with the aid of an alkali metal such as lithium, potassium or sodium in liquid ammonia in the presence of an alcohol. The reaction may be effected in the presence of an additional solvent such as tetrahydrofuran, dioxane or ethyl ether. The alcohol is preferably an alkanol of 1 to 6 carbon atoms such as methanol, ethanol, isopropanol or tert-butanol.

The ketalization agent is preferably an alkanol of 1 to 4 carbon atoms, or an alkylene glycol with 2 to 4 carbon atoms such as ethylene glycol or propylene glycol. The reaction is carried out in the presence of an acidic catalyst. The ketalization can also be effected by an exchange reaction with a dioxolane in the presence of an acidic catalyst. The dioxolane may be, for example, 2-methyl-2-ethyl-dioxolane, 2-methyl-2-phenyl-dioxolane, 2-methyl-4-(4'-methylbenzyl)-dioxolane, 2,2-dimethyl-4-(4'-methylbenzyl)-dioxolane, 2-chloro-methyl-dioxolane, 2β-chloroethyl-dioxolane, or 2-methyl-2-isopropenyl-dioxolane. The acidic catalyst is preferably a mineral acid such as hydrochloric acid, perchloric acid or sulfuric acid, a sulfonic acid such as para-toluene sulfonic acid or also boron trifluoride.

The oxidation of the 17β-hydroxyl compounds to 17β-ketone compounds is carried out with an oxidation agent in a neutral or basic medium in order to avoid cleavage of the protective group of the 3-ketone (ketal or enol ether). The oxidation agent is preferably a metal derivative as oxidizing agent (particularly a metal oxide), or as a catalyst (Oppenauer Reaction). The oxidation reaction is preferably effected by the Oppenauer method, consisting in oxidizing with a ketone in the presence of an aluminum alcoholate. The ketone is preferably a lower aliphatic ketone such as acetone, methylethyl ketone, methylisobutyl ketone or a cycloalkanone such as cyclohexanone. The aluminum alcoholate is preferably an aluminum trialkanolate derived from a lower alkanol such as aluminum isopropylate or tert-butylate. The oxidation reaction may also be effected with a metal oxide, preferably chromic anhydride in pyridine.

The introduction of a hydrocarbon substituent into the 17α-position is effected with the aid of an organometallic reagent where the organo is $R_1$ as defined above. Preferably, either organomagnesium halides of the formula $R_1MgX$ where X is a halogen atom, and particularly a chlorine, bromine or iodine atom, or alkali metal derivatives of the formula $R_1M$, where M is an alkali metal atom and particularly a lithium, sodium or potassium atom are used. The organometallic reagents are generally prepared just before use.

The hydrolysis of the ketals or the enol ethers leading to the regeneration of the ketone in the 3-position is effected with an acid able to effect at the same time as the hydrolysis, isomerization of the double bond $\Delta^{5(10)}$ to $\Delta^4$. Preferably a mineral acid is used such as hydrochloric acid, sulfuric acid or perchloric acid in an aqueous medium or a carboxylic acid such as acetic acid, formic acid, citric acid or trichloracetic acid in an aqueous medium or a mixture of these acids.

The functional derivatives of the organic carboxylic acids of the formula $R_2OH$ wherein $R_2$ is an acyl radical defined as above are the anhydrides or the acid chlorides.

The novel antiandrogenic and antiestrogenic compositions of the invention are comprised of an antihormonal effective amount of a compound of formula I or its enol ester and a pharmaceutical carrier. The compositions may be in the form of injectable solutions or suspensions in ampules or multi-dose flacons or in the form of implants, tablets, coated tablets, sublingual tablets, capsules, suppositories, ointments, creams or lotions made in the usual manner.

The compositions have the advantage that the etherification in the 11-position of the active ingredient causes the disappearance of androgenic and anabolic activities characteristic of 19-nor-testosterone compounds and the disappearance of estrogenic activities characteristics of gonadienic and $\Delta^{1,3,5(10)}$-gonatrienic compounds and causes the appearance of anti hormonal properties. The said compounds have a total lack of peripheral hormonal properties which cause disturbing side effects in therapeutics such as vascular troubles, weight gains, bleeding, chloasma and loss of hair.

The compositions are useful as medicants for the treatment of prostatic adenoma, hyperandrogenia, acne, hirsutism and also treatment of troubles caused by hyperestogenism. They are also useful for resting ovaries by blocking ovulation for example in the treatment of sterility, dysmenorrheas or ovarian dystrophies.

The compositions may also contain other active pharmaceutical compounds such as estrogens like ethynyl estradiol, mestranol or 11β-methoxy-17α-ethynylestradiol. These compositions associated with estrogens are useful estroprogestative formulations for contraceptive activity.

The novel method of the invention for inducing antihormonal activity in warm-blooded animals comprises administering to warm-blooded animals an effective amount of at least one compound of formula I or its enol esters. The said compounds may be administered orally, perlingually, transcutaneously, rectally or topically. The usual useful dose is 0.008 to 0.83 mg/kg depending on the method of administration and the specific compound.

In the following examples there are described several preferred embodiments to illustrate the invention. However, it should be understood that the invention is not intended to be limited to the specific embodiments.

EXAMPLE I

Preparation of
11β-Methoxy-17α-Ethynyl-Δ⁴-Estrene-17β-ol-3-One

Step A: 3,11β-dimethoxy-$\Delta^{2,5(10)}$-estradiene-17β-ol 10 gm of 3,11β-dimethoxy-$\Delta^{1,3,5(10)}$-estratriene-17β-ol, 72 ml of tetrahydrofuran and 3.6 ml of ethanol were cooled to −40°C, and 92 ml of liquid ammonia were added thereto with agitation. Then, 1.6 gm of lithium was added and the reaction mixture was agitated for two hours between −35°C and −40°C under an inert atmosphere. The mixture was again brought to −40°C, and after 26 ml of ethanol were added, ammonia was evaporated by heating. 110 ml of water were added without surpassing +15°C and the mixture was poured into iced water, agitated for one hour at +5°C, and vacuum filtered. The precipitate was washed with water and dried in vacuo to obtain 10 gm of 3,11β-dimethoxy-$\Delta^{2,5(10)}$-estradiene-17β-ol as colorless crystals melting at 189°C and soluble in ethanol and benzene, and insoluble in water.

As far as is known, this compound has not been described in the literature.

Step B: 11β-methoxy-Δ⁴-estrene-17β-ol-3-one 10 gm of 3,11β-dimethoxy-$\Delta^{2,5(10)}$-estradiene-17β-ol were refluxed for one hour with agitation and under nitrogen with 100 ml of methanol and 10 ml of N hydrochloric acid and after the solution was brought to room temperature, the mixture was poured into iced water. The mixture was extracted with methylene chloride, and the methylene chloride phase was washed with water, dried over sodium sulfate, filtered and evaporated to dryness in vacuo. The residue was left overnight at 0°C in the presence of some ether and dried to obtain 9.9 gm of 11β-methoxy-Δ⁴-estrene-17β-ol-3-one. The product was purified by crystallization from isopropyl ether to obtain 6.42 gm of the desired product in the form of colorless needles soluble in ethanol and benzene, and insoluble in water. The product melted first at 114°C, then 120°C and had a specific rotation $[\alpha]_D^{20} = +82°$(c=0.6% in dioxane).

Analysis: $C_{19}H_{28}O_3$; molecular weight = 304.41.
Calculated: %C 74.96; %H 9.27.
Found: %C 74.8; %H 9.0.
U.V. Spectrum (ethanol):
Max. at 242–243 mμ: $E_{1cm}^{1\%} = 536$ $\epsilon = 16,300$ As far as is known, this compound has not been described in the literature.

Step C: 3,3-ethylenedioxy-11β-methoxy-$\Delta^{5(10)}$-estrene-17β-ol 15 gm of 11β-methoxy-Δ⁴-estrene-17β-ol-3-one were dissolved at reflux with agitation in 400 ml of benzene containing 80 mg of para-toluene sulfonic acid and 80 ml of ethylene glycol and the reflux was maintained for 7 hours. The mixture was brought to room temperature and 100 ml of a saturated aqueous solution of sodium bicarbonate were added. The organic phase was decanted, and the aqueous phase was extracted with benzene. The combined benzene phases were washed with water until the wash water was neutral and after a drop of triethylamine was added, the solution was dried over sodium sulfate and evaporated to dryness in vacuo. The residue was dissolved in 50 ml of benzene, and then precipitated by the addition of isopropyl ether containing 1% of triethylamine. The precipitate was recovered by vacuum filtration, was washed with isopropyl ether containing 1% of triethylamine and dried in vacuo to obtain 13.10 gm of 3,3-ethylenedioxy-11β-methoxy-$\Delta^{5(10)}$-estrene-17β-ol as a colorless solid product soluble in acetone and ethyl acetate, slightly soluble in benzene and ether, and insoluble in water. The product melted at 104°–106°C.

As far as is known, this compound has not been described in the literature.

Evaporation of the mother liquor, gave a second crop of 4.5 gm of compound constituted of a mixture of the preceding compound and the corresponding $\Delta^{5(6)}$ isomer or 17.6 gm total product which was utilized as is in the following step.

As far as is known, the $\Delta^{5(6)}$ isomer has not been described in the literature.

Step D: 3,3-ethylenedioxy-11β-methoxy-$\Delta^{5(10)}$-estrene-17-one 17.7 gm of the product obtained in Step C were dissolved in 500 ml of toluene and 200 ml of cyclohexanone at reflux under an inert atmosphere and after 100 ml of the solvent were distilled off, 400 ml of a toluene solution of 2.28 gm of aluminum isopropylate per 100 ml were added over 15 minutes while maintaining a constant level of the solvent by distillation and the reflux. A solution of 100 gm of potassium sodium tartrate in 1000 ml of water were added while still maintaining the constant level of the solvent and the solution was cooled to room temperature, and then extracted with benzene. The benzene phases were washed with water until the wash water was neutral and then one drop of triethylamine was added. The solution was dried over sodium sulfate and then was evaporated to dryness in vacuo. The residue was chromatographed on silica and eluted with a 8:2 benzene-ethyl acetate mixture with 1% of triethylamine to obtain 3.56 gm of 3,3-ethylenedioxy-11β-methoxy-$\Delta^{5(10)}$-estrene-17-one melting at first 118°C, then 135°–140°C. The product occurred as a colorless solid product soluble in alcohol, acetone, benzene and chloroform, slightly soluble in ether and insoluble in water.

The compound was accompanied by 6.44 gm of 3,3-ethylenedioxy-11β-methoxy-$\Delta^5$-estrene-17-one melting at 128°C.

The mixture of the two compounds was used as is in the following step.

As far as is known, these compounds have not been described in the literature.

Step E: 3,3-ethylenedioxy-11β-methoxy-17α-ethynyl-$\Delta^{5(10)}$-estrene-17β-ol Into 250 ml of a toluene solution of 2.76 gm of sodium tert-amylate per 100 ml, a stream of acetylene was passed for two hours with agitation and then 40 ml of toluene were added thereto. 10 gm of the mixture of 3,3-ethylenedioxy-11β-methoxy-$\Delta^{5(10)}$-estrene-17-one and 3,3-ethylenedioxy-11β-methoxy-$\Delta^5$-estrene-17-one of Step D and 25 ml of tetrahydrofuran were added to the mixture and the passage of the acetylene stream was maintained for five hours. The reaction mixture was swept with an inert atmosphere and cooled to +10°C. A solution of 25 gm of ammonium chloride in 150 ml of water was added, and the mixture was agitated for 15 minutes. The organic phase was decanted, and the aqueous phase was extracted with toluene. The combined toluene phases were washed with water until the wash water was neutral, dried over sodium sulfate and evaporated to dryness in vacuo to obtain 9.47 gm of a mixture of 3,3-ethylenedioxy-11β-methoxy-17α-ethynyl-$\Delta^{5(10)}$-estrene-17β-ol and 3,3-ethylenedioxy-11β-methoxy-17α-ethynyl-$\Delta^5$-estrene-17β-ol.

Step F: 11β-methoxy-17α-ethynyl-$\Delta^4$-estrene-17β-ol-3-one

The mixture of the two compounds obtained in Step E with a solution of 180 ml of acetic acid, 6 ml of hydrochloric acid and 14 ml of water was stirred under a nitrogen atmosphere for 1½ hours and the reaction mixture was poured into a water-ice mixture. The reaction mixture was agitated for 2 hours and then was vacuum filtered. The precipitate was washed with water and dried in vacuo to obtain 5.91 gm of crude 11β-methoxy-17α-ethynyl-$\Delta^4$-estrene-17β-ol-3-one. By making the mother liquor alkaline, a second crop of 1.3 gm of product were obtained for a total of 7.21 gm. The 7.21 gm of product were chromatographed over silica, and eluted with a 5-5 benzene-ethyl acetate mixture. 6.6 gm of product were impasted with refluxing benzene and then was allowed to crystallize for 2 hours at 15°C. The mixture was vacuum filtered, and the recovered precipitate was washed with benzene and dried in vacuo to obtain 5.2 gm of 11β-methoxy-17α-ethynyl-$\Delta^4$-estrene-17β-ol-3-one melting at 212°–213°C. The product occurred as a colorless solid product soluble in alcohol, acetone, benzene and chloroform, slightly soluble in ether and insoluble in water.

For analysis, the compound was crystallized from ethyl acetate and the melting point remained the same.

Analysis: $C_{21}H_{28}O_3$; molecular weight = 328.44. Calculated: %C 76.79; %H 8.59. Found: %C 77.0; %H 8.6.

U.V. Spectrum(ethanol):

Max. at 242°–243 mμ: $E_{1cm}^{1\%}$ = 508 ε = 16 700

As far as is known, this compound has not been described in the literature.

The starting 3,11β-dimethoxy-$\Delta^{1,3,5(10)}$-estratriene-17β-ol and the other 11-alkoxy-13β-alkyl-$\Delta^{1,3,5(10)}$-gonatrienes were obtained by the processes described in Belgian Pat. No. 699,393 or Belgian Pat. No. 699,394.

EXAMPLE II

11β-methoxy-17α-ethynyl-17β-butyryloxy-$\Delta^4$-estrene-3-one

A mixture of 20 ml of benzene, 90 mg of paratoluene sulfonic acid and 1.8 ml of butyric anhydride was heated and 2 ml of benzene were distilled off. The mixture was brought back to room temperature, and 1 gm of 11β-methoxy-17α-ethynyl-$\Delta^4$-estrene-17β-ol-3-one was added. The reaction mixture was agitated for 17 hours under nitrogen, and cooled to between 0°C and +5°C. 1.8 ml of triethylamine were added, then 1.8 ml of methanol, followed by agitation for 15 minutes. The mixture was poured into water and was extracted with ether. The ether phases were washed with water, then several times with an aqueous solution of sodium bicarbonate until the pH of the wash water was neutral. The solution was dried over sodium sulfate and evaporated to dryness in vacuo. The residue was purified by chromatography over silica and elution with a 7:3 benzene-ethyl acetate mixture to obtain 710 mg of 11β-methoxy-17α-ethynyl-17β-butyryloxy-$\Delta^4$-estrene-3-one in the form of a colorless solid product soluble in alcohols, ether, chloroform and benzene, and insoluble in water.

U.V. Spectrum (ethanol):

Max. at 241 mμ: $E_{1cm}^{1\%}$ = 402 ε = 16 000

I.R. Spectrum(chloroform):

Presence of C≡C, ester, C—O—C and conjugated ketone.

As far as is known, this compound has not been described in the literature.

The chromatography also isolated a second product whose U.V. and I.R. spectral analysis showed that it was the 3-enolic ester of the said product or 3,17β-dibutyryloxy-11β-methoxy-17α-ethynyl-$\Delta^{3,5}$-estradiene.

As far as is known, this compound has not been described in the literature.

EXAMPLE III

Preparation of
11β-Ethoxy-17α-Ethynyl-$\Delta^4$-Estrene-17β-ol-3-one

Step A: 3-methoxy-11β-ethoxy-$\Delta^{2,5(10)}$-estradiene-17β-ol 320 ml of ammonia were cooled to −70°C and 8 gm of 3-methoxy-11β-ethoxy-$\Delta^{1,3,5(10)}$-estratriene-17β-ol (obtained by the process of the French Pat. No. 1,514,122), 160 ml of tetrahydrofuran and 120 ml of tert-butyl alcohol were added at −33°C with stirring. Finally, 13.5 gm of sodium were added, and the mixture was agitated for 1¾ hours at −33°C and again 1.5 gm of sodium were added. The ammonia was removed with a stream of nitrogen, and the residue was cooled to −30°C. 500 ml of water were added and the mixture was vacuum filtered. The recovered precipitate was washed with water to obtain 6.8 gm of 3-methoxy-11β-ethoxy-$\Delta^{2,5(10)}$-estradiene-17β-ol which was used as is in the next step. The compound was a colorless solid product melting at 130°C.

As far as is known, this compound has not been described in the literature.

Step B: 3,3-ethylenedioxy-11β-ethoxy-$\Delta^{5(10)}$-estrene-17β-ol

The 6.8 gm of 3-methoxy-11β-ethoxy-$\Delta^{2,5(10)}$-estradiene-17β-ol obtained in Step A were dissolved in 108 ml of methylethyldioxolane with 2% of glycol, and 136 mg of para-toluene sulfonic acid were added thereto. The solution was allowed to stand for 60 hours at room temperature, and then was poured into water. The mixture was extracted with methylene chloride, and the organic phases were dried over sodium sulfate and distilled to dryness in vacuo. The residue was chromatographed over silica and eluted with a 6:4 benzene-ethyl acetate mixture containing 1% of triethylamine. The residue was dissolved in 5 ml of ether, and the solution was filtered, and concentrated to half its volume. 3 ml of isopropyl ether were added, and the solution was concentrated to the start of crystallization, ice-cooled for 1 hour, and vacuum filtered. The recovered precipitate was washed with ice-cold isopropyl ether and dried to obtain 2.65 gm of 3,3-ethylenedioxy-11β-ethoxy-$\Delta^{5(10)}$-estrene-17β-ol in the form of a colorless solid product soluble in chloroform and benzene, and insoluble in water, and melting at 128°C.

I.R. Spectrum(chloroform):
Absence of carbonyl, presence of —OH and ketal.
As far as is known, this compound has not been described in the literature.

Step C: 3,3-ethylenedioxy-11β-ethoxy-$\Delta^{5(10)}$-estrene-17-one

A mixture of 2.6 gm of 3,3-ethylenedioxy-11β-ethoxy-$\Delta^{5(10)}$-estrene-17β-ol, 73 ml of toluene and 30 ml of cyclohexanone was heated, and 15 ml of solvent was distilled off. 58 ml of a solution of 2.28 gm of aluminum isopropylate in 100 ml of toluene were added thereto while distilling to maintain a constant volume. 100 ml of toluene were added while maintainin a constant volume, and the solution was refluxed, with agitation, for 1½ hours. The mixture was cooled to 20°C and the solution was vacuum filtered. The filter was washed with methylene chloride and the organic phase was concentrated in vacuo. The obtained oil was subjected to a steam distillation for 4 hours, and the oily residue was extracted with benzene. The benzene phase was washed with water, dried over sodium sulfate and distilled to dryness in vacuo. The residue was dissolved in 4 ml of methylene chloride, and after the solution was concentrated to half its volume, 4 ml of isopropyl ether were added. The solution was concentrated to the start of crystallization, ice-cooled for 1 hour, and vacuum filtered. The recovered precipitate was dried to obtain 1.365 gm of 3,3-ethylenedioxy-11β-ethoxy-$\Delta^{5(10)}$-estrene-17-one melting at 130°C. The product occurred as a colorless solid product soluble in chloroform, benzene and alcohols, and insoluble in water.

Further crystallization from the mother liquor gave 1.36 gm of product melting at 125°C which was purified by chromatography on silica and elution with a 9:1 benzene-ethyl acetate mixture containing 1% of triethylamine.

Analysis: $C_{22}H_{32}O_4$; molecular weight = 360.48. Calculated: %C 73.29; %H 8.94. Found: %C 73.3; %H 9.2.

I.R. Spectrum(chloroform):
Absence of —OH, presence of cyclopentanone and ketal.
As far as is known, this compound has not been described in the literature.

Step D: 3,3-ethylenedioxy-11β-ethoxy-17α-ethynyl-$\Delta^{5(10)}$-estrene-17β-ol A mixture of 83 ml of tetrahydrofuran, 38 ml of hexamethyl phosphoro triamide and 4.72 gm of potassium tert-butylate was cooled to 0°C and a stream of acetylene was passed therethrough for 1½ hours. A solution of 3.37 gm of 3,3-ethylenedioxy-11β-ethoxy-$\Delta^{5(10)}$-estrene-17-one in 5 ml of tetrahydrofuran was added and the mixture was agitated for 1½ hours at 0°C while continuing the bubbling of acetylene. Excess acetylene was removed by a stream of nitrogen and the suspension was poured into 500 ml of an aqueous saturated solution of ammonium chloride. The mixture was extracted with ether, and the ether phases were washed with water, dried over sodium sulfate and distilled to dryness in vacuo to obtain 3.74 gm of 3,3-ethylenedioxy-11β-ethoxy-17α-ethynyl-$\Delta^{5(10)}$-estrene-17β-ol which were used as in the following step.

I.R. Spectrum(chloroform):
Absence of —C=O, presence of —OH, —C≡CH and ketal.
As far as is known, this compound has not been described in the literature.

Step E: 11β-ethoxy-17α-ethynyl-$\Delta^4$-estrene-17β-ol-3-one 3.7 gm of 3,3-ethylenedioxy-11β-ethoxy-17α-ethynyl-$\Delta^{5(10)}$-estrene-17β-ol dissolved in 61.2 ml of acetic acid, 2.04 ml of hydrochloric acid and 4.76 ml of water were agitated for 1½ hours at room temperature and the solution was poured into a water-ice mixture. The mixture was agitated for 2 hours, and the precipitate was recovered by vacuum filtration, was washed with water and dried to obtain 2 gm of crude product melting at 160°C. By making the mother liquor alkaline, a second crop of 100 mg of product melting at 166°C was obtained.

The two combined crops were dissolved in 4 ml of methylene chloride, and the solution was chromatographed on magnesium silicate and eluted with methylene chloride. The obtained solution was concentrated in vacuo to 2 ml and 10 ml of isopropyl ether were added thereto. The mixture was concentrated by heating in vacuo, ice-cooled for one hour, and vacuum filtered. The recovered precipitate was washed with iced isopropyl ether and dried to obtain 1.6 gm of pale yellow crystals melting at 173°C. The crystals were dissolved in 3 ml of hot methanol containing 20% of water. The solution was ice-cooled for 1 hour and vacuum filtered to obtain two crops for a total of 1.116 gm of 11β-ethoxy-17α-ethynyl-$\Delta^4$-estrene-17β-ol-3-one melting at 174°C. The product occurred as colorless solid product soluble in chloroform, benzene and alcohols, and insoluble in water. By continuing ice-cooling of the methanol solution, a third crop of 231 mg of product melting at 170°C, was obtained. The mother liquors were passed over silica together with the third crop, and eluted with a 5:5 benzene-ethyl acetate mixture. The precipitate was crystallized from iced isopropyl ether to obtain 271 mg of the product melting at 174°C.

Analysis: $C_{22}H_{30}O_3$; molecular weight = 342.46.
Calculated: %C 77.1; %H 8.8.
Found: %C 76.8; %H 8.9.

I.R. Spectrum(chloroform):
Presence of —OH at $3595^{cm-1}$, of —C≡CH at $3300^{cm-1}$, of conjugated ketone at $1662^{cm-1}$ and of C=C at $1619^{cm-1}$.

U.V. Spectrum(ethanol):
Max. at 253 mμ: $E_{1cm}^{1\%} = 484$ $\epsilon = 16,600$
As far as is known, this compound has not been described in the literature.

EXAMPLE IV

Preparation of 11β-Methoxy-13β-Ethyl-17α-Vinyl-Δ⁴-Gonene-17β-ol-3-One

Step A: 11β-methoxy-13β-ethyl-$\Delta^{4,9}$-gonadiene-3,17-dione 8.967 gm of 13β-ethyl-$\Delta^{4,9}$-gonadiene-11β-ol-3,17-dione (obtained by the process of French Pat. No. 1,514,088) were dissolved in 448 ml of methylene chloride containing 1% methanol, and 0.88 ml of 70% perchloric acid was added thereto. The mixture was agitated for 10 minutes and then was poured into a mixture of equal parts of water and a saturated aqueous solution of sodium bicarbonate and extracted with methylene chloride. The organic phases were washed with an aqueous saturated solution of sodium bicarbonate, then with water, and dried over sodium sulfate, vacuum filtered and distilled to dryness in vacuo to obtain 9.628 gm of 11β-methoxy-13β-ethyl-$\Delta^{4,9}$-gonadiene-3,17-dione which was used as is in the next step.

For analysis the compound was crystallized from isopropyl ether and it occurred as colorless crystals soluble in benzene, ethanol and chloroform and insoluble in water, and melting at 115°C and having a specific rotation $[\alpha]_D^{20} = -21.5°. \pm 2.5 (c = 0.3\%$ in ethanol).

Analysis: $C_{20}H_{26}O_3$; molecular weight = 314.41.
Calculated: %C 76.40, %H 8.34.
Found: %C 76.4; %H 8.2.
U.V. Spectrum(ethanol):
Max. at 236 mμ: $E_{1cm}^{1\%} = 147$.
Max. at 292 mμ: $E_{1cm}^{1\%} = 639$; $\epsilon = 20,100$ As far as is known, this compound has not been described in the literature.

Step B: 11β-methoxy-13β-ethyl-$\Delta^{1,3,5(10)}$-gonatriene-3-ol-17-one

A solution of 9.088 gm of 11β-methoxy-13β-ethyl-$\Delta^{4,9}$-gonadiene-3,17-dione dissolved in 475 ml of methanol and 5.63 gm of 13.6% palladium hydroxide on magnesia was refluxed for 2½ hours with agitation under nitrogen and the solution was vacuum filtered. The filter was washed with boiling acetone and the filtrate was distilled to dryness in vacuo. The residue was taken up in 30 volumes of refluxing methanol and the solution was concentrated to 10 volumes, cooled, ice-cooled for 3 hours, and vacuum filtered. The recovered precipitate was washed with iced methanol and dried to obtain 5.319 gm of 11β-methoxy-13β-ethyl-$\Delta^{1,3,5(10)}$-gonatriene-3-ol-17-one melting at 226°C. For analysis, the compound was purified by a second crystallization and the melting point remianed unchanged.

The compound occurred as colorless crystals soluble in benzene, chloroform and ethanol, slightly soluble in methanol and insoluble in water. The product melted at 226°C and its specific rotation was $[\alpha]_{20}^D = +129 \pm 3°(c = 0.45\%$ in ethanol).

Analysis: $C_{20}H_{26}O_3$; molecular weight = 314.41.
Calculated: %C 76.40; %H 8.34.
Found: %C 76.2; %H 8.3.
U.V. Spectrum(ethanol):
Infl. towards 220 mμ: $E_{1cm}^{1\%} = 234$
Infl. towards 228 mμ: $E_{1cm}^{1\%} = 177$
Max. at 281 mμ: $E_{1cm}^{1\%} = 65$; $\epsilon = 2050$
Infl. towards 286 mμ: $E_{1cm}^{1\%} = 59$; $\epsilon = 1860$
I.R. Spectrum(chloroform):
Presence of aromatic at 1611 and 1587$^{cm-1}$, of —OH at 3588$^{cm-1}$, of cyclopentanone and of —C—O—C—.

As far as is known, this compound has not been described in the literature.

Step C: 11β-methoxy-13β-ethyl-17α-ethynyl-$\Delta^{1,3,5(10)}$-gonatriene-3,17β-diol 10.65 gm of were tert-butylate was dissolved in 213 ml of tetrahydrofuran with agitation and under an inert atmosphere and a stream of acetylene was passed into the solution for 15 to 20 minutes. 27 ml of hexamethylphosphorotriamide were then added and bubbling of acetylene was continued for 15 minutes. 5.093 gm of 11β-methoxy-13β-ethyl-$\Delta^{1,3,5(10)}$-gonatriene-3-ol-17-one were added, and the mixture was agitated under nitrogen while passing acetylene therethrough for 1 hour and 20 minutes. The mixture was cooled to between +5°C and +10°C and a solution of 6.35 ml of acetic acid and 77.5 ml of water was added. The mixture was agitated for 5 minutes, and the tetrahydrofuran was evaporated in vacuo. 8 ml of water were added, and the mixture was vacuum-filtered. The precipitate was washed with water and dried in vacuo. The residue was dissolved in 100 volumes of refluxing ethanol and the solution was concentrated and then iced, and vacuum filtered. The recovered precipitate was washed with iced ethanol and dried in vacuo to obtain 3.8 gm of 11β-methoxy-13β-ethyl-17α-ethynyl-$\Delta^{1,3,5(10)}$-gonatriene-3,17β-diol melting at 305°C.

For analysis, the product was crystallized from methanol and the melting point remained the same. The compound occurred as colorless crystals slightly soluble in alcohols, and insoluble in water, and melted at 305°C. Its specific rotation was $[\alpha]_D^{20} = +8° \pm 2(c = 0.6\%$ in pyridine).

Analysis: $C_{22}H_{28}O_3$; molecular weight = 340.44.
Calculated: %C 77.61; %H 8.29.
Found: %C 77.6 %H 8.5.
I.R. Spectrum (Nujol):
Presence of —OH, C≡CH at 3535 and 3306$^{cm-1}$ and of aromatic.
U.V. Spectrum
Infl. towards 217–218mμ: $E_{1cm}^{1\%} = 211$
Infl. towards 222 mμ: $E_{1cm}^{1\%} = 203$
Infl. towards 229 mμ: $E_{1cm}^{1\%} = 150$
Max. at 281 mμ: $E_{1cm}^{1\%} = 57$; $\epsilon = 1950$
Max. at 287 mμ: $E_{1cm}^{1\%} = 52$; $\epsilon = 1780$ As far as is known, this compound has not been described in the literature.

The 11β-methoxy-13β-ethyl-17α-ethynyl-$\Delta^{1,3,5(10)}$-gonatriene-3,17β-diol was reacted with dimethyl sulfate to obtain 3,11β-dimethoxy-13β-ethyl-17α-ethynyl-$\Delta^{1,3,5(10)}$-gonatriene-17β-ol which was treated with lithium in liquid ammonia to form the corresponding 17,21-dilithium derivative. The latter compound was then subjected to the Birch reduction with lithium and ethanol followed by acid hydrolysis to form 11β-methoxy-13β-ethyl-17α-vinyl-Δ⁴-gonene-17β-ol-3-one.

As far as is known, this compound has not been described in the literature.

EXAMPLE V

Preparation of 11β-Methoxy-13β-Ethyl-17α-Ethynyl-Δ⁴-Gonene-17β-ol-3One

11β-methoxy-13β-ethyl-$\Delta^{1,3,5(10)}$-gonatriene-3-ol-17-one of Step B of Example IV was reduced to form 11β-methoxy-13β-ethyl-$\Delta^{1,3,5(10)}$-estratriene-3,17β-diol which was methylated to obtain 3,11β-dimethoxy-13β-ethyl-$\Delta^{1,3,5(10)}$-gonatriene-17β-ol. Using the procedure of Example I, the said product was subjected to the Birch reduction to form 3,11β-dimethoxy-13β-ethyl-Δ$^{2,5(10)}$-gonadiene-17β-ol followed by acid hydrolysis to obtain 11β-methoxy-13β-ethyl-Δ$^4$-gonene-17β-ol-3-one. The latter product was treated with ethylene glycol to obtain a mixture of 3,3-ethylenedioxy-11β-methoxy-13β-ethyl-Δ$^{5(10)}$-gonene-17β-ol and 3,3-ethylenedioxy-11β-methoxy-13β-ethyl-Δ$^{5(6)}$-gonene-17β-ol which was then oxidized to form a mixture 3,3-ethylenedioxy-11β-methoxy-13β-ethyl-Δ$^{5(10)}$-gonene-17-one and its Δ$^{5(6)}$-isomer. The latter was then ethynylated to form a mixture of 3,3-ethylenedioxy-11β-methoxy-13β-ethyl-17α-ethynyl-Δ$^{5(10)}$-gonene-17β-ol-and its Δ$^{5(6)}$ isomer which was acid hydrolyzed to form 11β-methoxy-13β-ethyl-17α-ethynyl-Δ$^4$-gonene-17β-ol-3-one.

As far as is known, this compound has not been described in the literature.

PHYSIOLOGICAL STUDY

A. Antigonadotrophic activity

Antigonadotrophic activity was determined in pubescent rats weighing about 200 gm and 11β-methoxy-17α-ethynyl-Δ$^4$-estrene-17β-ol-3-one in an olive oil solution containing 5% benzyl alcohol was administered subcutaneously in a volume of 0.2 ml at the rate of 12 treatments in 14 days. On the 15th day, the rats were sacrificed by a carotoid cut and the seminal vesicles, the prostate, the testicles and the suprarenals were removed and weighed. The obtained results are summarized in Table I.

TABLE I

| Lots | Daily Doses | Testicles in mg | Seminal Vesicles in mg | Prostate in mg | Suprarenal in mg |
|---|---|---|---|---|---|
| Controls | 0 | 2,950 | 740 | 360 | 43.6 |
| 11β-methoxy-17α-ethynyl-Δ$^4$-estrene-17β-ol-3-one | 0.2 mg | 2,620 | 314 (−58%) | 240 (−33%) | 41.1 |
| | 1 mg | 2,070 (−30%) | 128 (−82%) | 97 (−73%) | 40.7 |
| | 5 mg | 1,400 (−53%) | 124 (−83%) | 87 (−76%) | 28.1 (−36%) |

11β-ethoxy-17α-ethynyl-Δ$^4$-estrene-17β-ol-3-one was tested under the same conditions in a sesame oil solution containing 5% of benzyl alcohol and the results are shown in Table II.

TABLE II

| Lots | Daily Doses | Testicles in mg | Seminal Vesicles in mg | Prostate in mg | Suprarenal in mg |
|---|---|---|---|---|---|
| Controls | 0 | 3,300 | 1,078.2 | 557.8 | 49.4 |
| 11β-ethoxy-17α-ethynyl-Δ$^4$-estrene-17β-ol-3-one | 0.2 mg | 2,900 | 414.5 (−62%) | 250.9 (−55%) | 56.2 |
| | 2 mg | 1,800 (−45%) | 92.0 (−91%) | 45.3 (−92%) | 44.0 |

The Tables show that the said products have an antigonadotrophic activity with a clear anti-LH predominance starting from a daily dose of 200 γ, and that they do not cause a suprarenal aplasia at this dose.

B. Antiestrogenic activity

Antiestrogenic activity was investigated in immature mice by a technique suggested by Rubin [Endo. 1951, Vol. 49, Pg. 429] and similar to that of Dorfman et al [Methods in Hormone Research, Dorfman, 1962, Vol. II, Pg. 118]. 19 to 21 days old mice received daily, in a subcutaneous injection or orally for 3 days, either estradiol alone, or the test product alone, or estradiol and the test product. In the last case, the two steroids were injected at different points. The mice were sacrificed on the 4th day and their uteri were removed and weighed. Estradiol in an olive oil solution with 5% benzyl alcohol added was injected at a total dose of 0.27γ and each injection was given in a volume of 0.1 ml/mouse. 11β-methoxy-17α-ethynyl-Δ$^4$-estrene-17β-ol-3-one was used in an olive oil solution containing 5% benzyl alcohol and was administered in total doses of 1.1–3.3 and 10 γ and the injections were also given in a volume of 0.1 ml/mouse.

The results are summarized in Table III.

TABLE III

SUBCUTANEOUSLY

| Lots | Doses | | Average weight of the uterus in mg |
|---|---|---|---|
| Controls | 0 | | 9.4 |
| Estradiol | 0.27 | γ | 76.2 |
| Test Product | 1.1 | γ | 9.6 |
| Test Product + estradiol | 1.1 + 0.27 | γ γ | 44.4 (−42%) |
| Test Product | 3.3 | γ | 10.6 |
| Test Product + estradiol | 3.3 + 0.27 | γ γ | 30.2 (−60%) |
| Test Product | 10 | γ | 13.4 |
| Test Product + estradiol | 10 + 0.27 | γ γ | 27.7 (−64%) |

In a second test, the test product was administered at doses of 0.37–1.1 and 3.3 γ under the same test conditions. The results are summarized in Table IV.

TABLE IV

| Lots | Doses | | Average weight at the uterus in mg |
|---|---|---|---|
| Controls | 0 | γ | 10.3 |
| Estradiol | 0.27 | γ | 69.8 |
| Test Product | 0.37 | γ | 9.2 |
| Test Product + estradiol | 0.37 + 0.27 | γ γ | 61.3 (−12%) |
| Test Product | 1.1 | γ | 9.6 |
| Test Product + estradiol | 1.1 + 0.27 | γ γ | 39.7 (−47%) |
| Test Product | 3.3 | γ | 12.7 |
| Test Product + estradiol | 3.3 + 0.27 | γ γ | 32.4 (−54%) |

The test product was administered orally at doses of 3.3–10 and 30 γ under the same test conditions and the results are reported in Table V.

TABLE V

| Lots | Doses | | Average weight of the uterus in mg |
|---|---|---|---|
| Controls | 0 | γ | 9.4 |
| Estradiol | 0.27 | γ | 76.2 |
| Test Product | 3.3 | γ | 10.1 |
| Test Product + estradiol | 3.3 + 0.27 | γ γ | 41.9 (−45%) |
| Test Product | 10 | γ | 14.1 |
| Test Product + estradiol | 10 + 0.27 | γ γ | 39.0 (−48%) |
| Test Product | 30 | γ | 18.9 |

TABLE V-Continued

| Lots | Doses | | Average weight of the uterus in mg |
|---|---|---|---|
| Test Product | 30 | γ | 25.7 (−68%) |
| %ESTRADIOL + | 0.27 | γ | |

In a second test, the test product was orally administered at doses of 0.37–1.1 and 3.3 γ and the results are shown in Table VI.

Table VI – Continued

| Lots | Doses | | Average weight of the uterus in mg |
|---|---|---|---|
| Controls | 0 | γ | 10.3 |
| Estradiol | 0.27 | γ | 69.8 |
| Test Product | 0.37 | γ | 7.5 |
| Test Product + estradiol + | 0.37 / 0.27 | γ / γ | 49.5 (−29%) |
| Test Product | 1.1 | γ | 10.3 |
| Test Product + estradiol + | 1.1 / 0.27 | γ / γ | 50.8 (−27%) |
| Test Product | 3.3 | γ | 10.5 |
| Test Product + estradiol + | 3.3 / 0.27 | γ / γ | 43.4 (−38%) |

11β-ethoxy-17α-ethynyl-Δ⁴-estrene-17β-ol-3-one was tested under the same conditions and was used in a sesame oil solution administered subcutaneously. The results of Table VII were obtained:

TABLE VII

| Lots | Doses | | Average Weights of the uterus en mg |
|---|---|---|---|
| Controls | 0 | γ | 8.7 |
| Estradiol | 0.27 | γ | 70.4 |
| Test Product | 1.1 | γ | 13.0 |
| Test Product + estradiol + | 1.1 / 0.27 | γ / γ | 30.5 (−56%) |
| Test Product | 3.3 | γ | 13.0 |
| Test Product + estradiol + | 3.3 / 0.27 | γ / γ | 26.1 (−63%) |
| Test Product | 10 | γ | 18.2 |
| Test Product + estradiol + | 10 / 0.27 | γ / γ | 22.6 (−78%) |

11β-methoxy-17α-ethynyl-17β-butyryloxy-Δ⁴-estrene-3-one was tested under the same conditions, and was administered subcutaneously in a sesame oil solution in doses of 10, 90 and 810 γ. The results of Table VIII were obtained:

TABLE VIII

| Lots | Doses | | Average Weights of the uterus en mg |
|---|---|---|---|
| Controls | 0 | γ | 8.0 |
| Estradiol | 0.27 | γ | 36.8 |
| Test Product | 10 | γ | 21.8 |
| Test Product | 90 | γ | 22.9 |
| Test Product | 810 | γ | 26.4 |

These results show that the 3 products possess a clear antiestrogenic activity towards estradiol and particularly that 11β-methoxy-17α-ethynyl-Δ⁴-estrene-17β-ol-3-one and 11β-ethoxy-17α-ethynyl-Δ⁴-estrene-17β-ol-3-one are active both subcutaneously and orally starting at a dose of 1.1 γ.

C. Progestomimetic activity

The progestomimetic activity was determined by the CLAUBERG Test in which immature rabbits were first sensitized by subcutaneous administration of estradiol benzoate for 5 days at a daily dose of 10 γ. They were then treated daily for 5 days with the test compound. The animals were sacrificed on the 6th day and the uterus sections were examined for lacy profileration of the endometrium characteristic of progesteromimetic action in Mac Phail units. 11β-methoxy-17α-ethynyl-Δ⁴-estrene-17β-ol-3-one in an olive oil solution containing 5% of benzyl alcohol was administered orally at doses of 125 and 250 γ. The results are summarized in Table IX.

TABLE IX

| | Daily doses | Mac Phail Units |
|---|---|---|
| Test Product | 125 γ | 1.8 |
| | 250 γ | 2.0 |

The test product thus possesses a distinct progestomimetic activity at a daily dose of 250 γ.

11β-ethoxy-17α-ethynyl-Δ⁴-estrene-17β-ol-3-one in a sesame oil solution, containing 5% of benzyl alcohol was orally administered to obtain the results of Table X.

TABLE X

| | Daily doses | Mac Phail Units |
|---|---|---|
| Test Product | 500 γ | 2.2 |
| | 2.5 mg | 2.8 |

The results show that the test product is endowed with a considerable progestomimetic activity at the dose of 500 γ.

D. Exogenous antiandrogenic activity

The exogenous antiandrogenic activity was determined against testosterone propionate in castrated male rats by the method of Lerner described by Dorfman in "Methods in Hormone Research", Vol. II, page 320. Young male rats, about 4 weeks old, were castrated and the treatment started on the day after castration and lasted 7 days. On the 8th day, the animals were sacrificed and the following organs removed: prostate, seminal vesicles and levator ani. 11β-methoxy-17α-ethynyl-Δ⁴-estrene-17β-ol-3-one and testosterone propionate in olive oil containing 5% benzyl alcohol were administered separately subcutaneously with the test product at the dose of 1 mg and testosterone propionate at the dose of 50 γ (daily doses per rat). A control group received the solvent only, a group of rats received subcutaneously 50 γ of testosterone propionate, a group of rates received subcutaneously 1 mg of the test product and a group of rats received subcutaneously 1 mg of the test product and subcutaneously 50 γ of testosterone propionate. The following table summarizes the results.

TABLE XI

| Lots | Daily Doses | Fresh Levator ani in mg | Seminal Vesicles in mg | Prostate in mg |
|---|---|---|---|---|
| Controls testosterone | 0 γ | 19.5 | 6.4 | 9.8 |

TABLE XI-Continued

| Lots | Daily Doses | Fresh Levator ani in mg | Seminal Vesicles in mg | Prostate in mg |
|---|---|---|---|---|
| propionate | 50 γ | 35.2 | 56.7 | 77.5 |
| Test Product | 1 mg | 20.6 | 15.4 | 11.1 |
| Test Product+ testosterone propionate | 1 mg +50 γ | 28.9 (−17%) | 42.8 (−25%) | 51.5 (−34%) |

The results shows that 11β-methoxy-17α-ethynyl-Δ⁴-estrene-17β-ol-3-one possesses a considerable antiandrogenic activity at a dose of 1 mg.

Various modifications of the compositions and methods of the invention may be made without departing from the spirit or scope thereof and it is to be understood that the invention is to be limited only as defined in the appended claims.

We claim:

1. An antiandrogenic and antiestrogenic composition comprising an effective amount of a compound of the formula

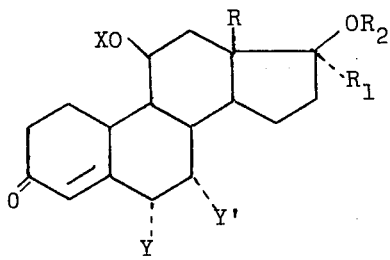

wherein R and X and alkyl of 1 to 4 carbon atoms, $R_1$ is a saturated or unsaturated hydrocarbon of 1 to 6 carbon atoms, $R_2$ is selected from the group consisting of hydrogen and acyl of an organic carboxylic acid of 1 to 18 carbon atoms and Y and Y' are selected from the group consisting of hydrogen and methyl and the enolic esters thereof with an organic carboxylic acid of 1 to 18 carbon atoms and a pharmaceutical carrier.

2. A method of inducing antiandrogenic and antiestrogenic activity in warm-blooded animals which comprises administering to warm-blooded animals an antiestrogenically and antiandrogenically effective amount of a compound of the formula

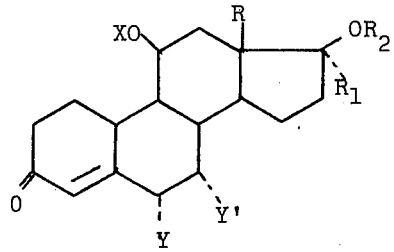

wherein R and X are alkyl of 1 to 4 carbon atoms, $R_1$ is a saturated or unsaturated hydrocarbon of 1 to 6 carbon atoms, $R_2$ is selected from the group consisting of hydrogen and acyl of an organic carboxylic acid of 1 to 18 carbon atoms and Y and Y' are selected from the ground consisting of hydrogen and methyl and the enolic esters thereof with an organic carboxylic acid of 1 to 18 carbon atoms.

3. The method of claim 2 wherein the compound is 11β-methoxy-17α-ethynyl-Δ⁴-estrene-17β-ol-3-one.

4. The method of claim 2 wherein the compound is 11β-ethoxy-17α-ethynyl-Δ⁴-estrene-17β-ol-3-one.

5. The method of claim 2 wherein the compound is 11β-methoxy-13β-ethyl-17α-ethynyl-Δ⁴-gonene-17β-ol-3-one.

6. The method of claim 2 wherein the compound is 11β-methoxy-17α-ethynyl-17β-butyryloxy-Δ⁴-estrene-3-one.

7. The method of claim 2 wherein the compound is 11β-methoxy-13β-ethyl-17α-vinyl-Δ⁴ gonene-17β-ol-3-one.

8. The method of claim 2 wherein the compound is 3,17β-dibutyryloxy-11β-methoxy-17α-ethynyl-Δ³,⁵-estradiene.

* * * * *